United States Patent [19]

Schertz

[11] 4,271,681
[45] Jun. 9, 1981

[54] LONG-TERM ICE STORAGE FOR COOLING APPLICATIONS

[75] Inventor: William W. Schertz, Batavia, Ill.

[73] Assignee: The United States of America as represented by the United States Department of Energy, Washington, D.C.

[21] Appl. No.: 37,078

[22] Filed: May 8, 1979

[51] Int. Cl.³ .............................................. F25D 23/12
[52] U.S. Cl. .............................................. 62/260; 62/59; 165/45; 165/104.26; 165/104.14; 165/104.17
[58] Field of Search ........................... 62/59, 259, 260; 165/45, 104 S, 105

[56] References Cited

U.S. PATENT DOCUMENTS

| 1,945,975 | 2/1934 | Munters | 165/105 |
| 3,854,454 | 12/1974 | Lazaridis | 165/105 |
| 4,003,214 | 1/1977 | Schumacher | 165/105 |

FOREIGN PATENT DOCUMENTS 659583  3/1936  Fed. Rep. of Germany ............ 62/259

Primary Examiner—Ronald C. Capossela
Attorney, Agent, or Firm—Paul A. Gottlieb; Frank H. Jackson; James E. Denny

[57] ABSTRACT

A device is providing for cooling a stored material and then for later use of the cold thus stored. The device includes a tank containing a liquid such as water which is frozen by means of a reflux condenser heat pipe.

8 Claims, 6 Drawing Figures

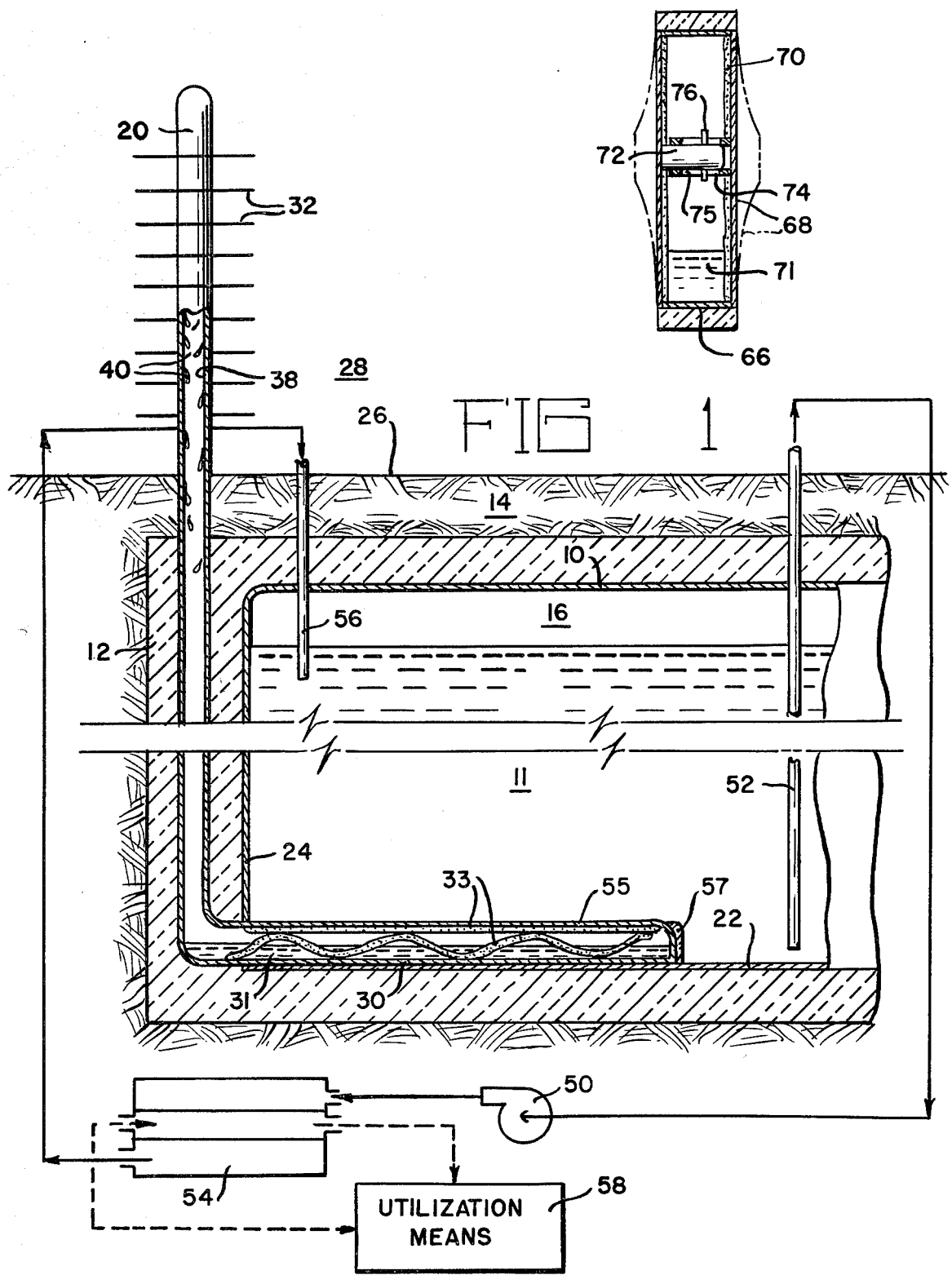

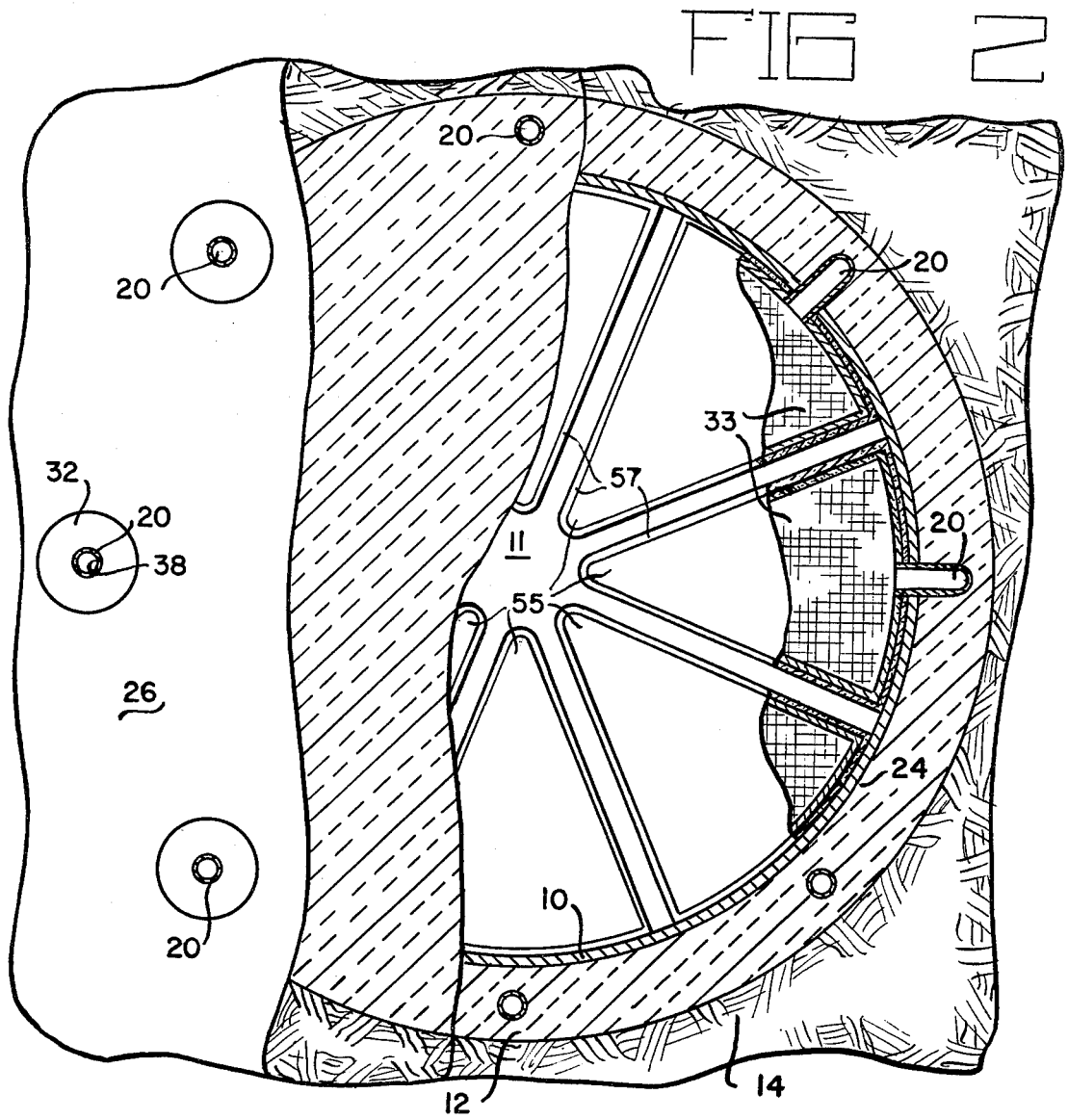
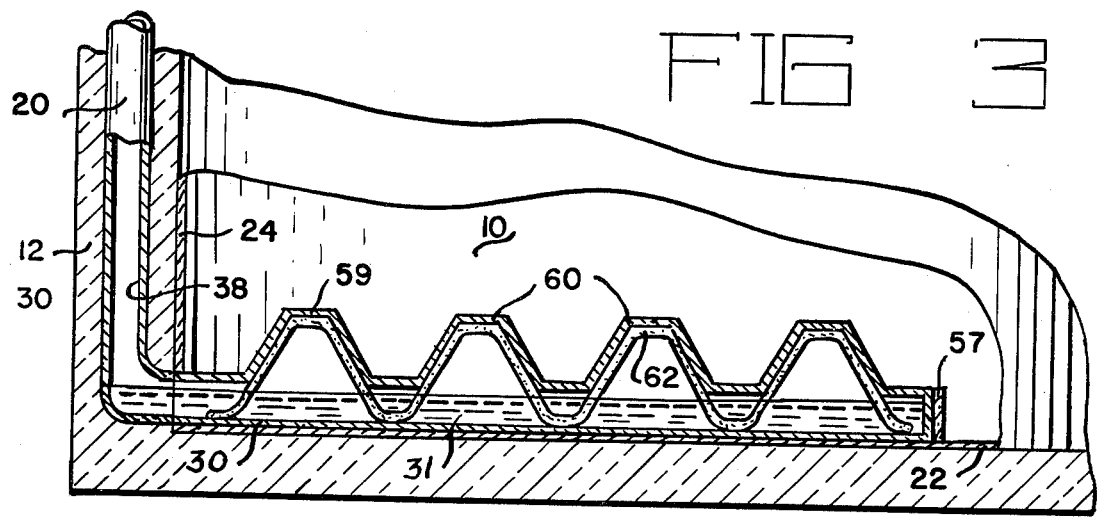

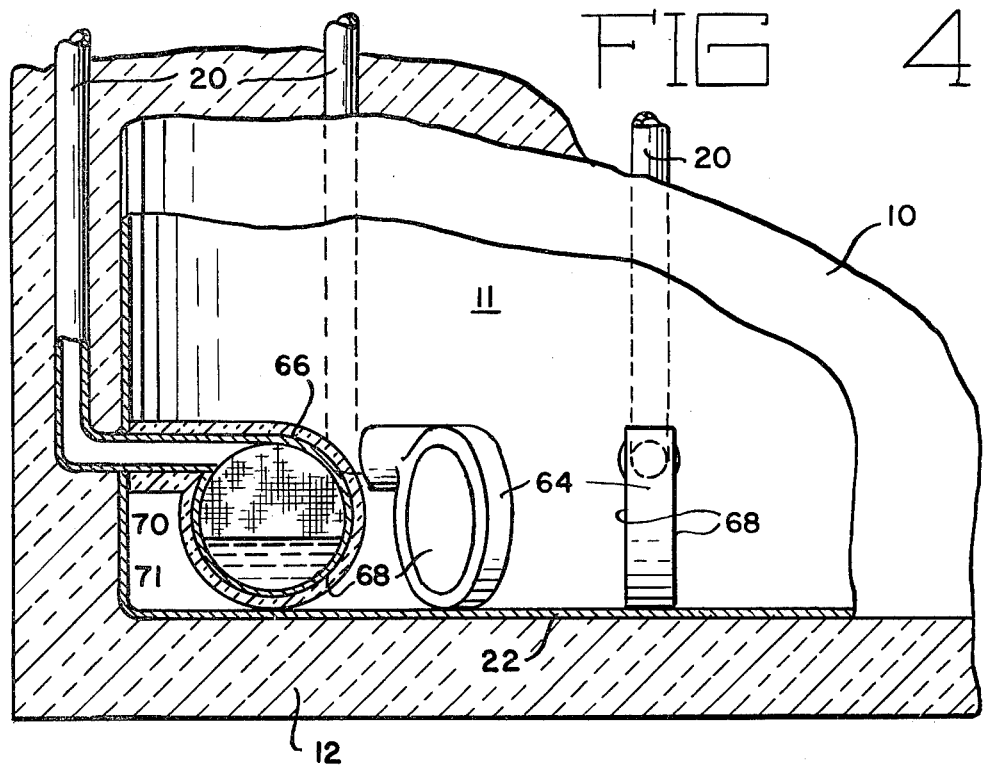
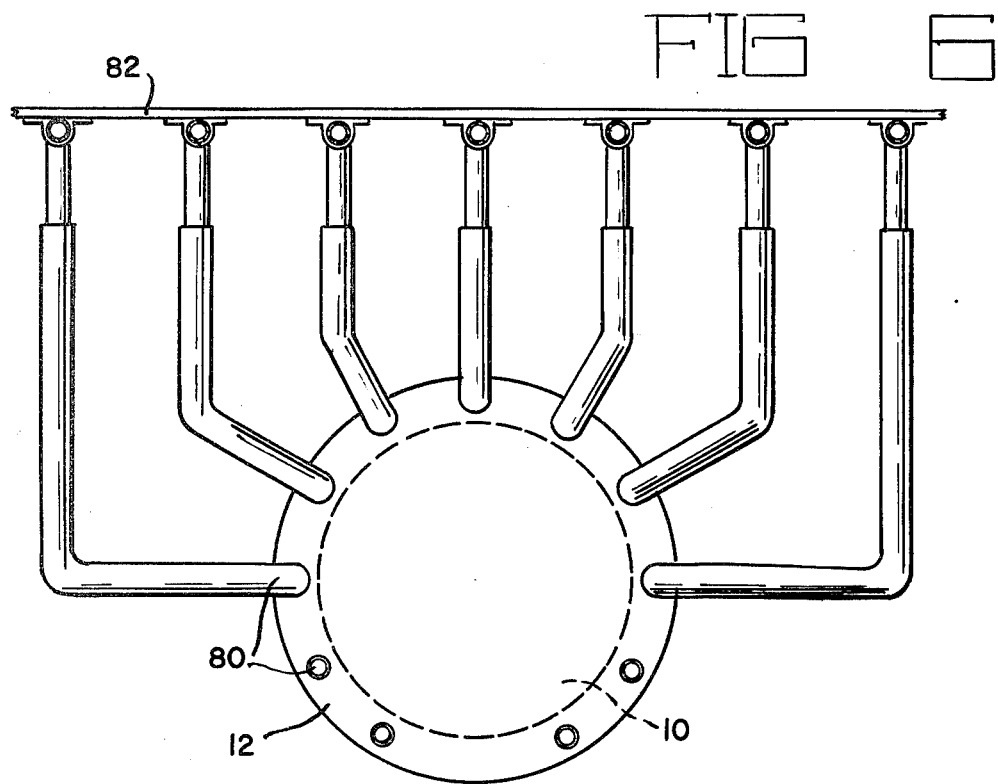

LONG-TERM ICE STORAGE FOR COOLING APPLICATIONS

CONTRACTUAL ORIGIN OF THE INVENTION

The invention described herein was made in the course of, or under, a contract with the U.S. DEPARTMENT OF ENERGY.

BACKGROUND OF THE INVENTION

The concept of freezing ice in the winter and using it to provide cooling in the summer is old, particularly for food refrigeration wherein blocks of naturally frozen water were sawn and stored in an ice house to be used in the summer for food preservation. With the advent of mechanical refrigeration cycles and the widespread availability of electrical power, stored ice declined in utilization. However, in the new energy concious age, the concept of long-term thermal energy storage is becoming more popular as increased utilization of solar energy is considered due to the energy crisis.

One example of such a system is the use of a large tank of water to store the summer heat for use in providing winter heat. Another example is the ACES (Annual Cycle Energy System) system in which ice is produced during the winter utilizing the waste heat from a heat pump that is heating the residence. The stored ice is then used for summer cooling. The ACES system is described in a report, "Design Report for the ACES Demonstration House," Oak Ridge National Laboratory, ORNL/COM-1 (October 1976) by A. C. Hise et al. Both of these systems are active systems which require pumps, valves and sensors to be operating while energy is being stored.

It is therefore an object of this invention to provide a system of storing the cold of the winter for utilization as a source of cooling.

Another object of this invention is to provide a passive system for storing a source of cooling.

SUMMARY OF THE INVENTION

A device is provided for storing coolness in a material and for later removal of this coolness for desired applications. The device includes a tank containing fluid and at least one reflux condenser heat pipe which penetrates the tank. The lower end of the heat pipe is immersed in the fluid and preferably extends along the bottom of the tank. The upper end of the pipe extends above the tank and is preferably exposed to the ambient environment. During the times when the external temperature of the ambient environment is lower than the internal temperature of the fluid stored in the tank, the heat is transmitted by action of the pipe from the fluid to the ambient. In the reverse situation, when the temperature of the ambient is higher than that of the fluid, no heat is reverse conducted and therefore the condenser pipe acts as a thermal diode. This action of continual removal of heat from the fluid will result in the relative coolness being stored in the fluid. Maximum cooling capability may be stored if the fluid, such as water, is actually frozen by this action. At some desired time this cooling of the fluid can be utilized as a source of coolness such as for summer air conditioning.

DESCRIPTION OF THE DRAWINGS

FIG. 1 is a cross section of a device for storing a source of coolness;

FIG. 2 is a top view of the storage device;

FIG. 3, FIG. 4 and FIG. 5 show alternate embodiments of the heat pipe utilized in the storage tank; and FIG. 6 shows an embodiment wherein the device is utilized for decorative purposes.

DETAILED DESCRIPTION

Referring to FIG. 1 and FIG. 2 there is shown a storage system for storing the relative coolness of the winter for use in summer air conditioning. A large tank 10, which in this embodiment is filled with water 11, is insulated with insulation 12 and buried in the earth 14. The burying of the tank is solely for aesthetic purposes. The tank may be in any location provided it is insulated to prevent the inflow or outflow of heat from the fluid contained in the tank. The tank is not totally filled with water, with a space 16 left to accomodate the volume expansion of ice as the water 11 in the tank freezes. Specially designed heat pipes 20 run from the bottom 22 of the tank through the side wall 24, vertically upwards through the insulation 12 and the earth 14 and extending above the earth's surface 26 into the ambient environment 28. The heat pipes 20 are designed to act as thermal diodes and in particular are described by the term reflux condenser type heat pipes. A reflux condenser heat pipe is one which basically will conduct heat in only one direction. As an example, such tubes are available having a heat conduction ratio in one direction to the other direction of about 1000 to 1. Such heat pipes have been used on the Alaska Pipeline to insure that the permafrost supporting the pipe is not thawed by the pipeline.

The heat pipe 20 is an evacuated pipe that has been partially back filled with a low boiling point fluid such as ammonia or one of the fluorocarbons. Gravity ensures that the liquid phase 31 is maintained at the bottom 30 of the heat pipe 20. Fins 32 may be included on the exposed top of the heat pipe to promote heat transfer to the ambient environment 28. Within the heat pipe 20 is a wick material 33 which disperses the liquid phase 31 of the fluid within the heat pipe to promote evaporation due to the temperature and pressure differences within the pipe 20.

The operation of the tank is as follows. When the ambient temperature of the atmosphere 28 drops below the temperature of the water 11 in the tank 10, the low boiling point fluid in the heat pipe 20 condenses on the upper surface 38 of pipe 20 exposed to the ambient 28, and gravity returns the condensate 40 to the bottom of the tube. The reduction in pressure caused by the condensation causes the liquid 31 at the bottom of the tube 20 to boil, and the heat of vaporization for this boiling is supplied by the water. Vapor then flows by virtue of the resulting pressure gradient to the top of tube 20 and condenses on surface 38, completing the cycle. When the temperature of the ambient 28 is low enough, ice forms on the surface of the lower end 30 of the heat pipe in contact with water 11. The end 30 of the heat pipe 20 may have a variety of designs to ensure that the ice thus formed will break off periodically and rise to the top of tank 10, thus exposing a fresh, clean freezing surface along surface 30 of pipe 20. The frozen chunks of ice float to the top of the container and are stored for further use. Sufficient head room 16 is left in the top of the tank when it is filled with water to accomodate the volume expansion of the ice. This points out one significant difference with previous methods of freezing water wherein the water was generally frozen from the outside walls inward with the result that not a great volume of water could be frozen since the inner water would never freeze. By freezing small chunks at the bottom which then rise, it is believed a greater water volume may be frozen and thus more energy stored.

When the temperature of the ambient 28 exceeds the temperature of the tank 10, the low boiling fluid condenses at the bottom 30 of the heat pipe 20 and the heat pipe 20 does not transfer heat from the tank back to the environment. Thus the heat pipe 20 acts as a thermal diode.

If the heat pipe 20 is long and narrow the amount of heat conducted will be quite low and as stated before the ratio of conduction out of the tank to into the tank can be on the order of 1000 to 1. As the ambient temperature cycles above and below freezing during the winter season, the ice freezes and is thus stored automatically. The tank 10 tends to slowly fill with ice from the top down. No operator interaction of any kind is required. The unit is basically passive. The stored cooling capacity may then be utilized at some later date.

Utilization may be obtained by pumping some of the water 11 in tank 10, via pump 50 coupled to outlet pipe 52 through a heat exchanger 54. After passing through heat exchanger 54, the water thus drawn may be returned to the tank via pipe 56. The returned water having been warmed after passing through the heat exchanger will promote melting of the water, further enhancing the cyclic ability of the system. A conventional means 58 of utilizing the cool via heat exchanger 54 can be utilized. For example a fan system could blow hot air over the cool water, thus cooling the air to provide for summer air conditioning.

The heat pipes 20 have several design constraints. They must act as heat diodes and transfer the thermal energy out of the tank and dissipate the energy to the ambient. Whenever the ambient is warmer than the tank contents, the heat pipes must act as a thermal diode and not transfer thermal energy into the storage tank. The ice will form on the surface of the heat pipe that is immersed in the water, and eventually could impede the heat transfer. Therefore, provisions should be made to remove the ice from the surface automatically and in accordance with a passive design, a passive system of ice removal is preferred.

Referring to FIG. 1, FIG. 2, FIG. 3, FIG. 4 and FIG. 5, there are shown specific designs which will promote passive ice break-up from the bottom of the tubes. FIG. 1 and FIG. 2 show heat pipes 20 having ends in the shape of large flat pans 36 that are insulated with insulation 57 on the bottom and sides to keep ice from locking on by encapsulation. The ice begins to form on the top surface which is preferably coated with a material such as Teflon to promote release and as the layer builds up, the temperature drop across the ice film causes the heat pipe surface 55 to drop below 0° C. This results in a lowering of pressure, and the surface bows in slightly. The flexing action breaks the ice loose and clears the surface. The water in contact with the surface is now at about 0° C. and warms the surface again. The slightly supercooled surface 55 has another potential benefit in that it may aid in the initial formation of the ice crystals. If ice has formed during the night and has not yet been released by morning, the rise in pressure that accompanies the usual temperature rise in the morning will aid in breaking off the ice. To obtain good nucleation of the ice on a Teflon coated surface 55, small nucleating sites may be required. These may be as simple as uncoated regions or may require special surface treatments.

Referring to FIG. 3, there is shown an alternate design for the lower section of the heat pipe which promotes breaking off of the ice. In this design the heat transfer plate 59 of pipe 20 is convoluted and consists of multiple fingers 60 that protrude upward from the surface. Ice forming on the surface creates a buoyant force that pulls it from the surface. The ice then rises to the top of the tank and is automatically stored. Wick 62 conforms in shape to the fingers 60 so that fluid 31 is made to contact the surfaces of fingers 60.

An alternate design is shown in FIG. 4 and FIG. 5. Here the end 64 of heat pipe 20 is flat but upright. The perimeter 66 of the disc-shaped bottom of pipe 20 is insulated so that only the large area sides 68 are exposed for freezing. Ends 68 contain wicking 70 in a pancake shape in contact with the upright sides and a fluid 71. Once again the force of buoyancy will be enough to break the ice off. The sides of ends 68 may bow and protection against excess bowing is provided by post 72 fixed to one side of end 68, sleeve 74 with slot 75 fixed to the other side and pin 76 fixed on post 72 and engaged in slot 75. Bowing is limited thereby as shown by the phantom lines.

Transfer of heat out of the tank is obtained by using a low boiling fluid within heat pipes 20, such as ammonia, fluorocarbons such as freon-11, carbon dioxide or a short chain hydrocarbon such as propane, butane or pentane. None of these materials will present an unacceptable hazard since the unit must be outdoors for operation in order to achieve efficient heat transfer from the exposed end 38 of the heat pipe. The use of fluorocarbons may not be advisable because they are being removed from the market to avoid the possibility of ozone depletion, and the vapor pressure of carbon dioxide is much higher than required. Ammonia is probably the preferred fluid because of its abundance, low boiling point and its ability to quickly dissipate if it should escape from a pipe. The establishment of a 2° F. temperature difference between the condensing section and the evaporator section within the heat pipe will give a 1.8 psi driving force for the vapor to flow up the condenser when ammonia is the working fluid.

The reverse flow of heat such as from the hot summer ambient to the ice through the heat pipe is suppressed by the elimination of any wicking material 34 in the upper sections of pipes 20. Thus the liquid is prevented by gravity from rising to the hot zone. The only mechanism for heat transfer is by conduction down the pipe walls. This can be shown to be insignificant in comparison to other losses. Thus the heat pipe operates as a thermal diode allowing thermal energy to flow out of the tank and reducing the flow of heat into the tank to a very low value whenever the outside ambient temperature exceeds the tank temperature.

Since the ends of the heat pipes must extend above the surface for efficient heat dissipation, there might be a problem of the aesthetics of such a system. However, these pipes in and of themselves produce no danger or any excess of temperatures so they may be touched by humans and animals without any danger. Therefore they can be hidden decoratively. This is shown in FIG. 6 where the pipes are utilized as fence posts. As shown in FIG. 6, the pipes 80 extend from the tank 64 and emerge from the ground in a straight line which can be utilized to form a fence 82. Other possibilities include utilizing the extended pipes to form the side walls of a gazebo.

The geographical limit in the United States for such a device for use as an air conditioning system would probably be about the Mason-Dixon Line. Below this line there would not be sufficient days when the outer temperature would be less than that in the water to store sufficient ice to provide significant amounts of summer cooling.

The embodiments of the invention in which an exclusive property or privilege is claimed are defined as follows:

1. A device for cooling a material and for later utilization of this stored cool, comprising:

a tank containing a fluid, and at least one thermal diode in the form of a reflux condenser heat pipe which penetrates said tank and whose lower end is immersed in said fluid, said pipe including a low boiling point material and a wick confined to said lower end, said wick enhancing the dispersing of said low boiling material over the surface of said lower end in contact with said fluid, the upper end of said pipe extending above said tank and being exposed to the ambient environment, said pipe being responsive to the temperature of the ambient, being less than that of the fluid to transfer heat from said fluid to the ambient and said pipe being responsive to the temperature of the ambient being higher than that in the fluid to resist transfer of heat from the ambient to the fluid, and utilization means coupled to said tank for utilizing the cold stored in said fluid by action of said pipe.

2. The device of claim 1 wherein said lower end of said heat pipe in contact with said fluid is flattened and extends in a horizontal direction with the vertical sides thereof being insulated.

3. The device of claim 1 wherein said lower end of said heat pipe in contact with said fluid is flattened and extends in the vertical direction with the horizontal sides thereof being insulated.

4. The device of claim 1 wherein said lower end of said heat pipe is convoluted with fingers extending into said fluid, said wick extending into said fingers.

5. In a device for cooling a material and for later utilization of this stored cool, including a tank containing a fluid at least one thermal diode in the form of a heat pipe which penetrates the tank and whose upper end of the heat pipe extends above the tank and is exposed to and responsive to the ambient environment temperature, and a lower end of the heat pipe immersed in the fluid, the improvement comprising, a passive flexing structural means forming the lower end of the heat pipe to effectuate passive release of ice forming on the lower end, thereby preventing ice from clustering about said heat pipe.

6. The device of claim 5 wherein said passive flexing means forming the heat pipe in contact with said fluid is flattened and extends in a horizontal direction with the vertical sides thereof being insulated.

7. The device of claim 5 wherein said passive flexing means forming the lower end of the heat pipe in contact with said fluid is flattened and extends in the vertical direction with the horizontal sides thereof being insulated.

8. The device of claim 5, wherein said means forming the lower end of the heat pipe is convoluted with fingers extending into the fluid, and further includes a wick extending into said fingers.

* * * * *